July 15, 1947.  F. SUTTON  2,424,210

FLUID CONTROLLING VALVE

Filed March 16, 1942  3 Sheets-Sheet 1

INVENTOR,
Frank Sutton,
BY Simon Order
ATTORNEY.

July 15, 1947.    F. SUTTON    2,424,210
FLUID CONTROLLING VALVE
Filed March 16, 1942    3 Sheets-Sheet 3

INVENTOR,
Frank Sutton,
BY Simon Broder
ATTORNEY.

Patented July 15, 1947

2,424,210

UNITED STATES PATENT OFFICE 2,424,210

FLUID CONTROLLING VALVE

Frank Sutton, Cwmbran, England

Application March 16, 1942, Serial No. 434,974
In Great Britain April 9, 1941

19 Claims. (Cl. 251—159)

This invention relates to fluid controlling valves of the kind in which during opening and closing there is a transverse movement of the movable obturating member in relation to one or more ports, while in the closed position the seal between the inlet and outlet is provided by volume compression of a resilient material.

In a valve of such kind either the movable obturating member or its cooperating part of the valve body may be of the resilient material, and if the valve is left closed for a long time, there is danger of the resilient material permanently bulging under the volume compression into the port or ports in the cooperating part of the valve body or in the obturating member, as the case may be, and seriously hindering or even preventing subsequent opening of the valve.

A principal object of the present invention is to prevent such bulging, and in accordance with the invention this is done by means of shields of rigid material positioned to cover the port or ports in the closed position of the valve while leaving the inlet and outlet completely unobstructed when the valve is open. This not only prevents the bulging referred to but also maintains the compression of the resilient material in the neighborhood of the port or ports when the valve is closed and so keeps the pressure more uniform in the material.

The invention is applicable both to the plug-gate type of valve, in which a plug having a separate or integral facing of the resilient material is moved transversely across at least one of the ports and when both the ports are covered is compressed in such a way as to expand it and thereby seal the closure, and to the rotary plug type in which a sleeve of the resilient material is provided between the plug and body and end pressure is exerted on the sleeve. In both cases it will be noted that though pressure is exerted on the resilient material in one direction, the resulting volume compression causes it to expand and make a seal in directions substantially at right angles to the direction of applied pressure and normal to the sealed surfaces.

As regards plug-gate valves the invention is particularly applicable to valves of the type described in Patent No. 2,290,251, to Saunders, but is not confined to such, since it is applicable where the plug is tapered, and where the plug partially enters a recess in the valve body in the closing position.

Figure 1:
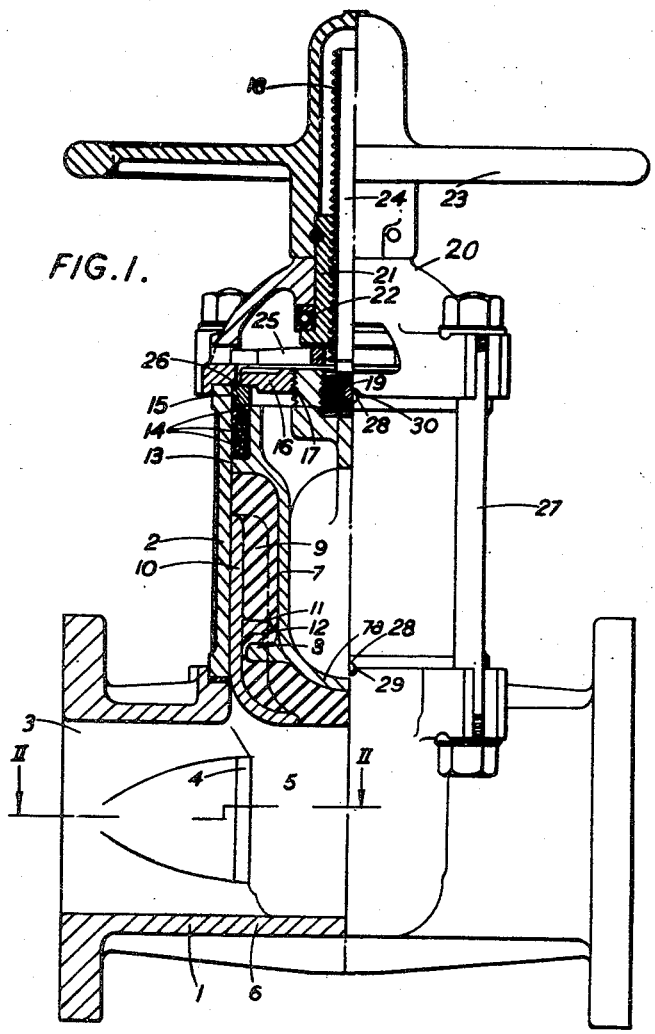
Figure 2:
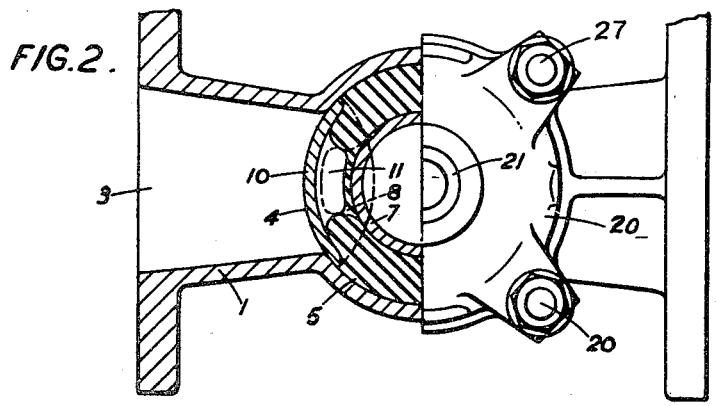
Figure 3:
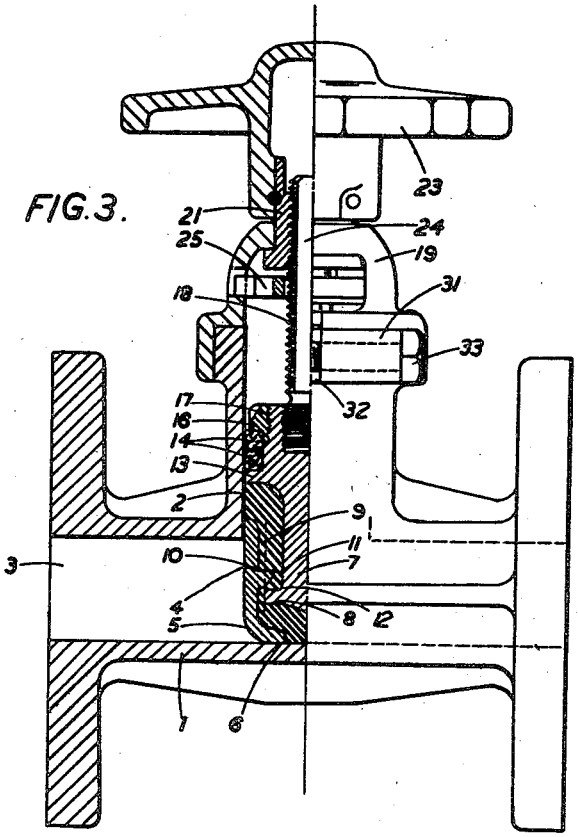
Figure 4:
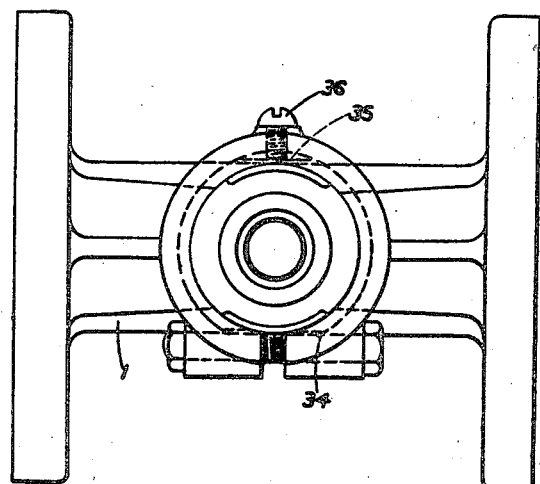
Figure 5:
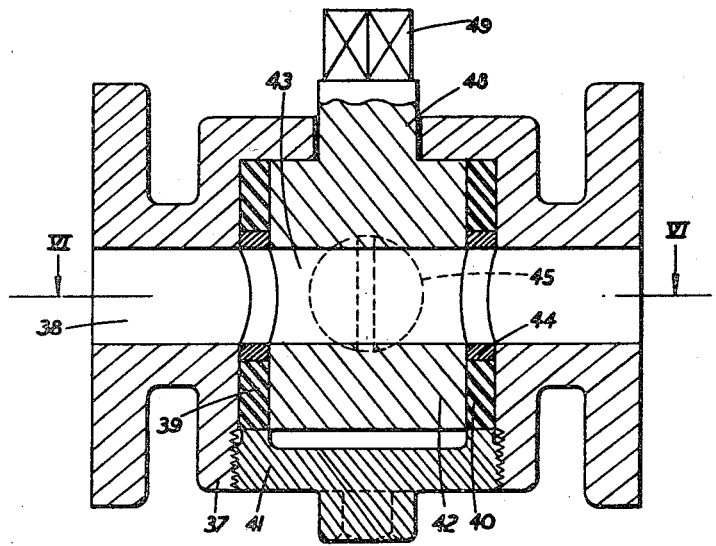

The invention will further be described with reference to the accompanying drawings given by way of example, and in which Figure 1 is an elevation, half in axial section, of a relatively large plug-gate type of valve, incorporating the present invention, Figure 2 is a plan view of Figure 1; the left hand side is taken in section on a plane indicated by the line II—II of Figure 1 but with the valve closed, while the right hand half is in plan but with the handwheel and spindle omitted, Figure 3 is a similar view to Figure 1 of a smaller size of plug-gate type of valve incorporating the present invention, Figure 4 is a plan view of Figure 3 with the handwheel and spindle omitted, Figure 5 is a vertical section and Figure 6 a horizontal section, of a rotary plug type of valve incoporating the invention.

The valves of Figures 1 and 2 and Figures 3 and 4 respectively are, apart from the structure of the plug itself of generally known construction, and they also have many features in common; these have been given the same references and will be first described together. In both cases there is a body 1 and a transverse cylindrical chamber 2. The bore of the body merges gradually from circular cross-section at the ends 3 to a cross section with flat sides at the ports 4 where the bore enters a transverse cylindrical part 5 which in these examples is a continuation of the chamber 2. These examples also have the wall 6 of the bore opposite the chamber flat and placed so that along the median plane of the bore this wall is continuously aligned from one end of the body to the other, but it is emphasized that the invention is in no way confined to valves having these features of construction.

Slidable in the chamber 2 and cylindrical part 5 is a plug member, described in detail below, which constitutes the obturator and which includes at least a covering 9 of resilient material which, when the plug is in closing position, is compressed axially and thereby pressed radially, so sealing across the wall 6 and up the sides of the plug and also round the lower margin of the chamber 2.

The radial pressure also acts towards the ports 4 and, to prevent the material from bulging into these ports, the invention provides a pair of shields 10 of rigid material of sufficient width and length to cover the ports and preferably to overlap them a little all round when the valve is closed. It should be emphasized that since the seal is not made round the edges of the ports themselves, these shields in no way interfere with the tightness of the valve and do not need even to be machined, provided they are reasonably smooth.

Since the resilient material must undergo some deformation when it is compressed axially, it is highly desirable that the shields shall not be secured to the material; so that they may move with the plug they are provided with lugs 11 engaging in suitable slots in the plug. This same arrangement and the independence of the two shields enables the valve to close tightly even should a small obstruction lodge under one of them. In the preferred construction shown in which the plug is of constant cross section, in the illustrated examples of circular section, the resilient material itself can be made with a small but definite clearance in the chamber 2 and part 5 while the shields are lodged in recesses in the resilient material and are preferably slightly proud of the resilient material and a good sliding fit. They then serve to guide the plug member and hinder its being forced to one side by the fluid pressure during opening and closing far enough to cause abrasion of the resilient material. The shields preferably follow the contour of the plug round to the end face which abuts the wall 6 in closing position.

Preferably the resilient material does not constitute a solid plug, but is in the form of a covering over a central core 7 of metal; to permit of proper compression of the material 9 it is highly desirable for the latter not to be secured to the core, but to prevent it from leaving the core, through which motion is imparted to the whole plug, the core is provided with radial lugs 8. These lugs are positioned to project below the lugs 11 so that they also ensure lifting of the shields when the plug is raised to open the valve. Preferably however a little space is left between the lugs 8 and 11 into which the resilient material extends, as indicated at 12. When the plug is closed and the material 9 compressed, a slight separation occurs at 12. The lower end of the core 7 is preferably rounded as at 7a to assist in compressing the resilient material in the proper directions for sealing.

Where the size of the plug admits, the core 7 may itself be hollow, as shown in Figure 1.

The plug may be moved by any suitable means. In both illustrated examples a known arrangement of screw mechanism is used. This comprises a screwed spindle 18 pinned at 19 to the core 7. A bonnet 20 secured to the chamber carries a threaded bush 21 coacting with the spindle and located endwise in the bonnet by a bearing flange 22 at one end and a keyed handwheel 23 at the other. Rotation of the spindle is prevented by providing it with flats 24 and passing it through a correspondingly shaped aperture in a keying yoke 25 the ends of which engage in slots in the bonnet 20.

It is desirable in such a valve to provide packing means to prevent the upward escape of fluid when the valve is partly or wholly open. The illustrated examples show a known arrangement in which the chamber 2 is of smooth cylindrical bore, and the packing is carried by the plug. The core 7 is provided with a flange 13 above which are seated a number of suitable packing rings 14 which are compressed by a nut 16 screwing on to a threaded boss 17 on the core 7. If desired a washer 15 (Figure 1) may be interposed. Also if desired the bonnet may have an inwardly projecting flange 26 which forms a stop for the opening of the valve and in the open position engages the washer 15 but not the nut 16, thus increasing the pressure in the packing at the time it is usually most needed.

It is necessary in the case of a plug of circular section to make certain that the parts are assembled with the shields opposite the ports 4. To ensure this automatically, means may be provided which only permit attachment of the bonnet 20 to the chamber 2 in one position or in two positions relatively at 180° in a straight through valve; the arrangement of the spindle 18 and keying yoke 25 prevents any rotation of the plug relative to the bonnet. The means adopted will depend on the means for attaching the bonnet, and suitable modifications of two known attachments are shown in the illustrated examples.

In Figures 1 and 2 the chamber 2 is separate from the valve body 1 and it is clamped between the bonnet and body by tie bolts 27. To ensure correct relative angular position, dowel pins 28 project radially from the chamber at the top and bottom, and the body and bonnet are correspondingly grooved at 29 and 30 respectively. By providing similar grooves on the other side, two possible assembly positions are provided but this is not essential.

In Figures 3 and 4 the chamber 2 is integral with the body 1. The bonnet fits over the chamber end and is provided with a boss 31, radially slotted at 32 and carrying a clamping bolt 33 positioned to come within the periphery of the chamber wall. The bonnet can only be attached therefore in either of two positions where one of two opposite grooves 34, 35 admits the insertion of the bolt 33. A set screw 36 may be provided in the bonnet which enters the groove not occupied by the bolt.

Figure 6:
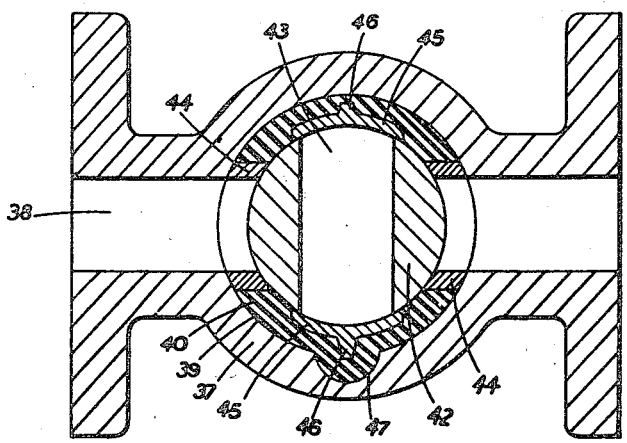

In the example shown in Figures 5 and 6 the valve comprises a body 37 having a straight through bore 38 from end to end. At the centre a transverse chamber 39 of substantially larger diameter than the bore 38 is provided, and this is lined with a sleeve 40 of resilient material, upon which endwise pressure is exerted by clamping between the top of the chamber and a cap 41 screwing into the bottom of the chamber. Within the sleeve 40 is the rotary obturating plug 42 having a bore 43 which can be turned into alignment with the bore 38 to open the valve as in Figure 5, or at right angles to the bore 38 to close the valve as in Figure 6. The sleeve is of course provided with openings in register with the bore 38 and these openings are preferably provided with rings 44 of hard material to protect the edges of the openings. To provide for rotation of the plug 42 in the illustrated example it has an upwardly projecting integral spindle 48 passing through an aperture in the valve body and terminating in a squared portion 49 to receive a handle, hand wheel or the like.

Because the plug rotates it must be of circular cross section, but it can have any convenient axial section which will permit of assembly. Preferably as shown its axial section is rectangular, i. e., it is a cylinder. The pressure of the cap 41 on the sleeve 40 causes the latter at all times to press radially against the body and the plug, thus sealing the entry from the inlet and also sealing the chamber 39 round the top so that leakage where the spindle emerges is prevented without further packing. Leakage at the bottom would be similarly prevented if the cap 41 did not constitute a hermetic closure. So far the construction of the valve is on known lines.

Bulging of the material of sleeve 40 into the bore 43 when the valve is closed is prevented by the provision, in accordance with the invention, of shields 45 of sufficient size to overlap the bore 43 all round. These shields are mounted, preferably loosely, in recesses in the sleeve and retained by projections 46 on their backs. If desired the sleeve itself may have a projection 47 lodging in a recess in the valve body, to ensure assembly of the sleeve with the shields in the correct position. It will be seen that the shields do not extend far enough to break the seal afforded by the sleeve, but as they are in rubbing contact with the plug they must be smoothly finished.

In all cases the nature of the resilient material will depend on the fluid to be controlled. For most commonly encountered fluids a natural or synthetic rubber composition is suitable, and in the case of valves having a plug of the construction shown in Figures 1 to 4 the rubber can be moulded and vulcanized on the core 7, care being taken to prevent vulcanization of the rubber to the core. Suitable shaping of the mould will provide the recesses for the shields. For some fluids such as gasoline a cork composition can be used, while for low pressure steam a resilient asbestos composition will be suitable. Since the shields come into contact with the fluid they are best of the same material as the valve body so that they have the same resistant character. The same applies to the rings 44 in Figures 5 and 6.

What I claim is:

1. In a valve for fluids, the combination of a body having inlet and outlet ports, an obturating member comprising a substantially complete cylinder of resilient material and having transverse movement in relation to at least one of said ports for opening and closing the passage of fluid through said body, said resilient material being adapted under volume compression to seal the inlet from the outlet in the closed position of the valve, and a thin rigid arcuate shield upon the obturating surface of said plug positioned to prevent bulging under compression of said resilient material into any port with respect to which said obturating member has transverse movement, while leaving such port unobstructed when the valve is open, the shield covering that portion of the resilient material that in the closed position of the valve is aligned with the passageway of the valve to prevent the resilient material from bulging into the passageway, and exposing the resilient material to sealing contact throughout the periphery of the fluid passage to effect a tight seal.

2. In a valve for fluids, the combination of a body having a passage through it, an obturating plug movable transversely into said passage substantially to close it, a substantially complete sheath of resilient material about said plug, means for exerting pressure upon said plug to compress the resilient material thereof into sealing contact with said body whereby one end of said passage is sealed from the other, and shields of rigid material upon the obturating surface of said plug positioned to prevent bulging of said resilient material into said passage, while leaving said passage unobstructed when the valve is open, the shield covering that portion of the resilient material that in the closed position of the valve is aligned with the passageway of the valve to prevent the resilient material from bulging into the passageway, and exposing the resilient material to sealing contact throughout the periphery of the fluid passage to effect a tight seal.

3. In a valve for fluids, the combination of a body, a chamber on said body, said body having an internal continuation of the interior of said chamber, a plug, a substantially complete sheath of resilient material about said plug, means for moving said plug from the interior of the chamber into said continuation and exerting sufficient pressure upon it to cause the resilient material of the plug to expand into sealing contact with the walls of the chamber and the continuation, said body also having a through passage opening into said continuation by inlet and outlet ports at least one of which is in a position such that said plug moves transversely with respect to it, and a shield of rigid material on the obturating surface of said plug positioned to cover and overlap any port with respect to which said plug moves transversely when said plug is in said continuation, the shield covering that portion of the resilient material that in the closed position of the valve is aligned with the passageway of the valve to prevent the resilient material from bulging into the passageway, and exposing the resilient material to sealing contact throughout the periphery of the fluid passage to effect a tight seal.

4. A valve for fluids comprising a body, a transverse chamber in said body, the interior of said chamber having a continuation into said body and said body having a passage entering and leaving the said continuation by ports in the sides thereof of less width than the width of the chamber, a plug member, means for moving said plug from the said chamber into said continuation and axially compressing it, said plug being of such cross section as to fit said chamber with slight clearance, and comprising a facing of resilient material on its sides and outer end, recesses opposite said ports, a shield of rigid material lodged loosely in each said recess and completing the contour of the plug, and means holding said shields in engagement with the plug during movement of the latter.

5. A valve as set forth in claim 4 wherein said shields are of the same material as said body.

6. A valve as set forth in claim 4 wherein said plug also comprises a metal core on which said facing is supported without surface attachment.

7. A plug gate for a fluid valve having a through passage opening by opposite side ports into a transverse passage of constant cross section for the plug, comprising a resilient body of the same cross section as the transverse passage except for recesses on opposite sides of slightly larger size than said ports, and a shield of rigid material loosely held in each recess of such shape as substantially to fill the recess and to complete the cross section of the plug.

8. A plug gate as set forth in claim 7 comprising an inwardly projecting lug on each shield engaging a slot in the plug.

9. A plug gate for a fluid valve having a through passage opening by opposite side ports into a transverse passage of constant cross section for the plug, comprising a metal core of less section than said transverse passage and having a rounded outer end, diametrically opposite lugs projecting from said core near the rounded end thereof, a covering of resilient material supported on said core in contact therewith but without surface attachment thereto, said covering bringing the section of the core substantially up to that of said transverse passage except for opposite recesses of slightly larger size than said ports and located in register with said lugs, a pair of metal shields shaped substantially to fill said recesses and to complete the cross section of the plug, and an inwardly projecting lug on each said shield located to project over a respective core lug.

10. A plug gate as set forth in claim 9 wherein the inwardly projecting lugs are longitudinally spaced a small distance from the lugs projecting from the core, and the resilient covering extends into the space between the respective lugs.

11. A plug gate as set forth in claim 9 wherein the cross section is such that the outer surfaces of said shields are a sliding fit for said transverse passage while the outer surface of the resilient covering is a clearing fit for said transverse passage.

12. A valve as set forth in claim 4 wherein said plug is of circular cross section and said means for moving said plug also includes means for automatically locating said plug with said shields in proper angular register with said ports.

13. A valve as set forth in claim 4 wherein said plug is of circular cross section, and said means for moving said plug includes a bonnet, a screw spindle secured to said plug, means in said bonnet for preventing rotation of said screw, a screwed bush coacting with said spindle borne and located endwise in said bonnet, means for rotating said bush, and means adapted to secure said bonnet to the upper end of said chamber only in a position in which said shields will correctly register with said ports when the valve is closed.

14. In a valve for fluids, the combination of a body having a through bore and a transverse chamber of circular section of larger diameter than the width of the bore at its junctions therewith, a resilient sleeve lining said chamber and having openings in register with the bore of the valve, an obturating plug rotatably fitted in said sleeve and having a bore which in one position of the plug aligns with the bore of the valve, means exerting endwise pressure on said sleeve to expand it radially into sealing contact with said body and plug, the bore of said sleeve being recessed at positions located opposite and overlapping the ends of said plug bore when the valve is closed, and shields of rigid material lodged within and substantially filling said recesses.

15. A valve as set forth in claim 14 wherein said shields rest loosely in said recesses.

16. A valve as set forth in claim 14 wherein said shields, body and plug are of the same material.

17. A valve as set forth in claim 14 wherein said sleeve has a projection on its outer surface lodging in a recess in the body.

18. A valve for fluids, comprising a body through which the fluid may flow, an arcuate member of resilient material which in the closed position of the valve is subjected to volume compression and extends across a part of the fluid passage, and a thin shield of comparatively rigid material carried by and upon a portion of the obturating face of the resilient material, which shield in the closed position of the valve abuts upon and covers that part of the fluid passage across which the resilient material extends and thereby prevents the resilient material from burgeoning into the passage, the shield covering that portion of the resilient material that in the closed position of the valve is aligned with the passageway of the valve to prevent the resilient material from bulging into the passageway, and exposing the resilient material to sealing contact throughout the periphery of the fluid passage to effect a tight seal.

19. A valve for fluids, comprising a body through which the fluid may flow, a closure member movable in the body from a position in which the fluid passage is uninterrupted to a position in which the fluid passage is closed, a sheathing of resilient material interposed between the body and the closure member and in the closed position of the valve extending across the fluid passage in one of them, means for exerting pressure on the sheathing to expand it in a direction normal to the exerting pressure to make a seal between the body and the closure member, and a comparatively thin rigid arcuate shield carried by and on a portion of the obturating face of the sheathing which in the closed position of the valve abuts upon and covers the part of the fluid passage across which the sheathing extends and thereby prevents burgeoning of the sheathing into the passage, the shield covering that portion of the resilient material that in the closed position of the valve is aligned with the passageway of the valve to prevent the resilient material from bulging into the passageway, and exposing the resilient material to sealing contact throughout the periphery of the fluid passage to effect a tight seal.

FRANK SUTTON.

REFERENCES CITED

The following references are of record in the file of this patent:

UNITED STATES PATENTS

| Number | Name | Date |
|---|---|---|
| 2,293,153 | Lorehn | Aug. 18, 1942 |
| 1,695,992 | Bergsten | Dec. 18, 1928 |
| 2,194,256 | Allen | Mar. 19, 1940 |
| 946,877 | Rothchild | Jan. 18, 1910 |
| 451,746 | Baines | May 5, 1891 |
| 1,849,580 | Klinger | Mar. 15, 1932 |
| 2,194,263 | Allen | Mar. 19, 1940 |
| 2,194,264 | Abercrombie | Mar. 19, 1940 |

FOREIGN PATENTS

| Number | Country | Date |
|---|---|---|
| 331,216 | France | Sept. 2, 1903 |
| 688,382 | France | May 12, 1930 |